July 11, 1967  J. K. LIU  3,330,163
VARIABLE SPEED DRIVE
Filed March 3, 1965
3 Sheets-Sheet 1
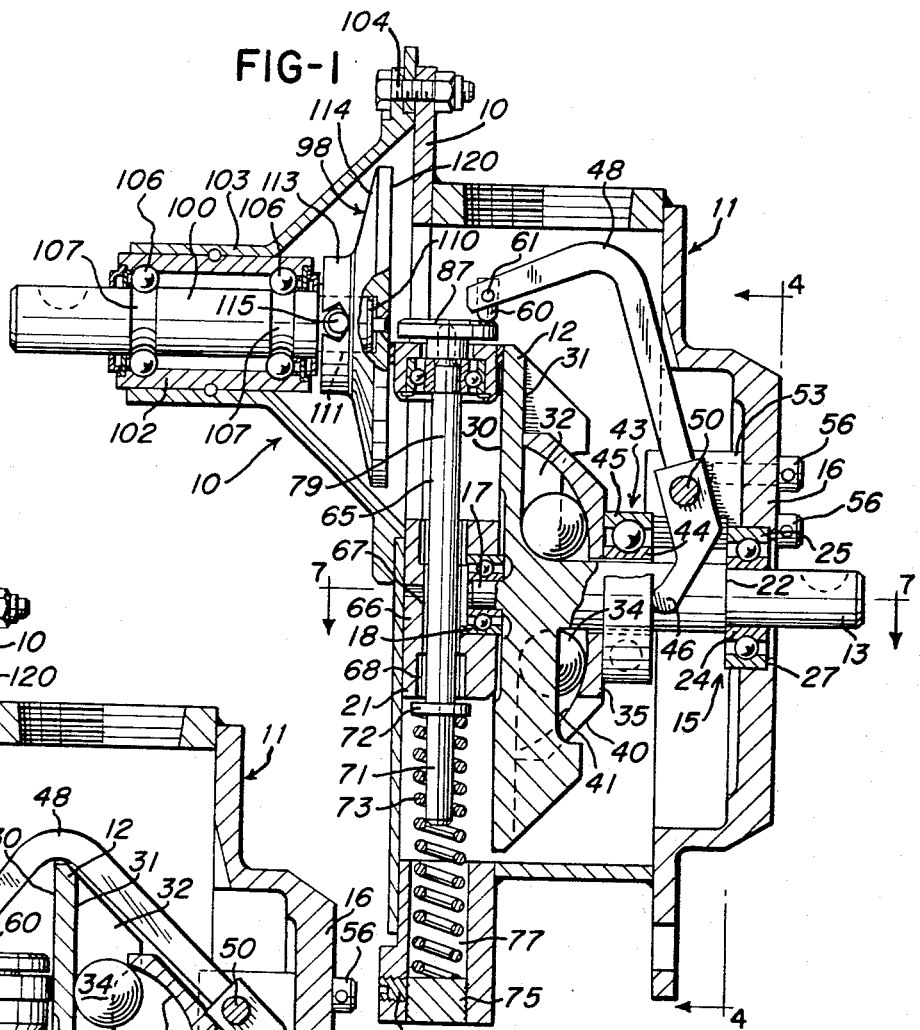
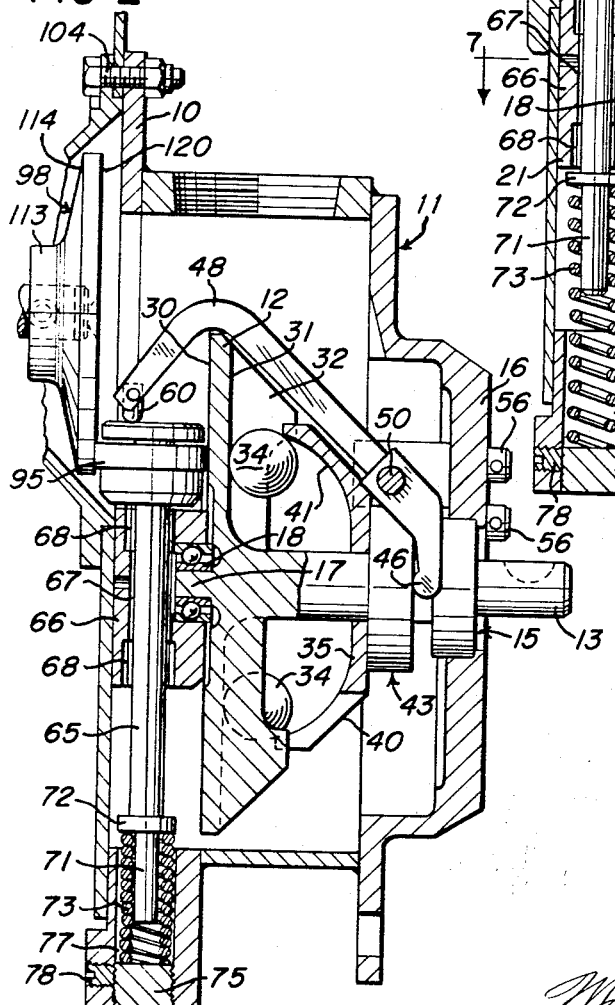
INVENTOR.
JOHN K. LIU
BY
Marechal, Biebel, French & Bugg
ATTORNEYS

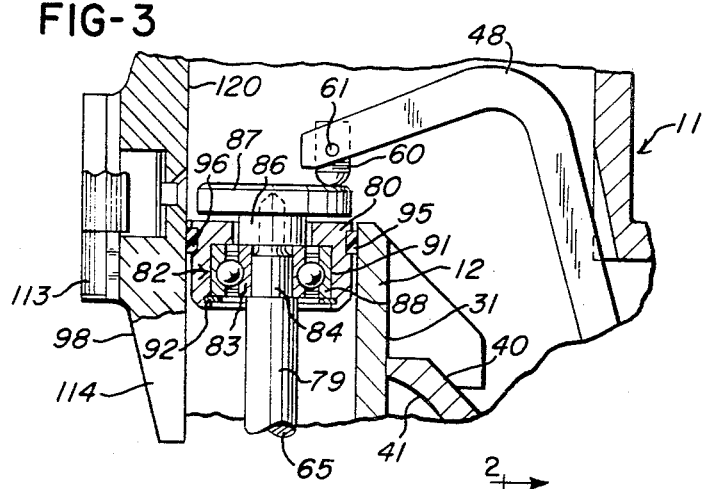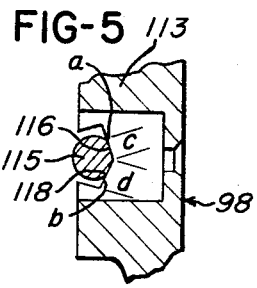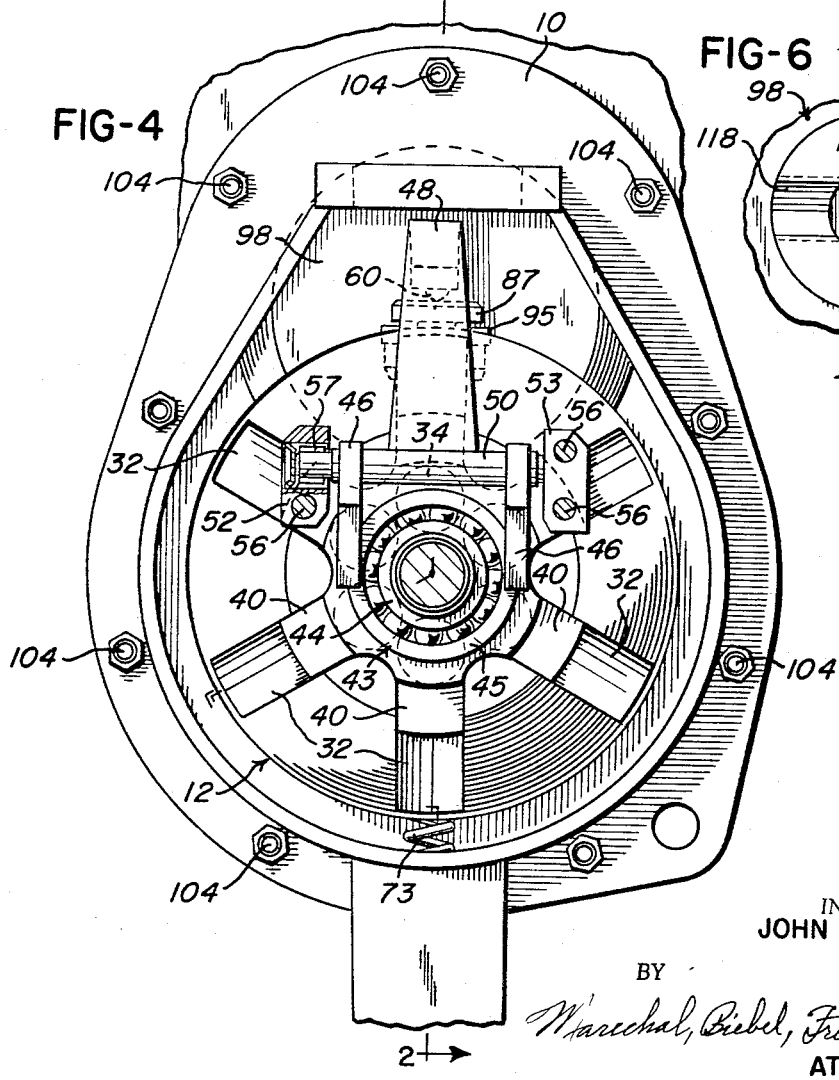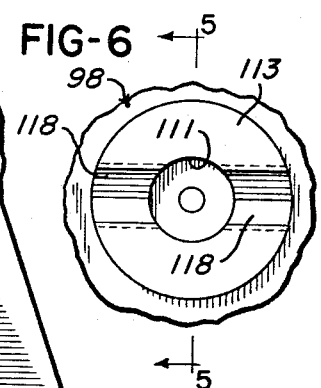

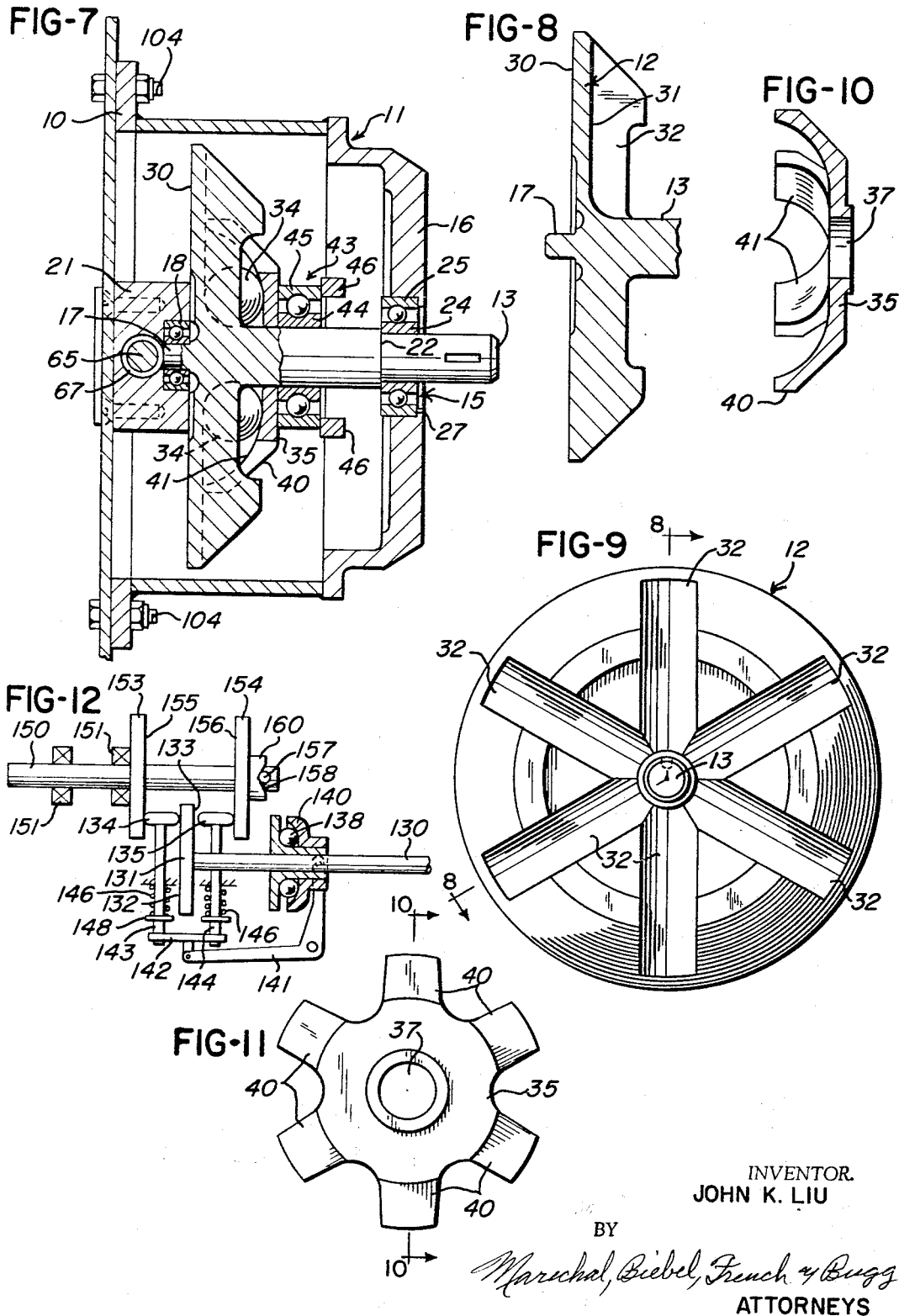

United States Patent Office 3,330,163
Patented July 11, 1967

3,330,163
VARIABLE SPEED DRIVE
John K. Liu, New Castle, Ind., assignor to Force Control, Inc., New Castle, Ind., a corporation of Indiana
Filed Mar. 9, 1965, Ser. No. 438,248
7 Claims. (Cl. 74—190.5)

ABSTRACT OF THE DISCLOSURE

A speed control device having a pair of disks with smooth overlapping surfaces which are interconnected by a roller whose position on the radii of the smooth surface can be shifted. A variable speed input automatically produces constant speed output as a result of a speed responsive device which is mechanically connected to the input shaft and to the roller so that movement of the roller on the radii of the disk changes the relative rate of rotation therebetween to maintain automatically a constant output speed.

This invention relates to a variable speed drive wherein a variable input produces a preselected output speed, for example, a constant output speed.

An important object of this invention is to provide an improved speed transmission device wherein a preselected output speed is automatically produced even though the input speed varies over a wide range, and particularly to provide such a device which is compact and capable of operation without slippage.

Another object of this invention is to provide an improved speed transmission of the aforesaid type with frictional contact between the transfer wheel and the input and output disks which automatically increases as required to prohibit slippage during periods of high torque, and further to provide such a device with improved mechanism responsive to centrifugal forces to modify the transmission to compensate for changes in input speed to achieve a constant output speed.

A further object of this invention is to provide an improved compact and lightweight drive transmission of simplified design for maximum dependability and operation, and particularly to provide a drive transmission which is inexpensive with a minimum of constantly rotating parts thus reducing wear and noise.

Further objects and advantages of the invention will be apparent from the following description, the accompanying drawings and the appended claims.

In the drawings—

FIG. 1 is a sectional view through the variable speed drive;

FIG. 2 is another sectional view similar to FIG. 1 showing the mechanism in an alternate position;

FIG. 3 is an enlarged fragmentary sectional view showing a portion of the invention;

FIG. 4 is a sectional view taken along the line 4—4 of FIG. 1;

FIG. 5 is a sectional view taken along the line 5—5 of FIG. 6;

FIG. 6 is a fragmentary end view of the output disk looking from left to right in FIG. 1;

FIG. 7 is a sectional view taken along the line 7—7 of FIG. 1;

FIG. 8 is a sectional view of the input drive disk taken along the line 8—8 of FIG. 9;

FIG. 9 is a side view of the input drive disk looking from right to left of FIG. 1;

FIG. 10 is a sectional view of the retainer cam taken along the line 10—10 of FIG. 11;

FIG. 11 is an elevational view of the retainer cam looking from right to left in FIG. 1; and FIG. 12 is a schematic illustration of another embodiment of the invention.

Referring to the drawings wherein preferred embodiments of the invention is illustrated, FIG. 1 shows the variable speed drive assembly 10 including a central housing 11 in which the various components thereof are mounted. The input disk 12 has the input drive shaft 13 formed integrally therewith and an intermediate portion of of this drive shaft is supported by the ball bearing 15 mounted in the side wall 16 of the housing 11. The opposite end of the input disk 12 has an axial extension 17 thereon which is received and supported for rotation in the ball bearing 18 mounted in the housing 11 by the support block 21 so that the drive shaft 13 and input disk 12 rotate freely within the housing. The shoulder 22 on the drive shaft 13 limits the axial movement of the drive shaft to the right by engaging the inner race 24 of the bearing 15, and rightward movement of this bearing is prohibited by the engagement of the outer race 25 with the shoulder 27 formed on the housing 11.

The input disk 12 has a substantially flat outer surface 30 whereas the opposite side 31 of this disk has a plurality of radially extending grooves 32 (FIGS. 8 and 9) of predetermined configuration and adapted to receive the spherical metal balls 34 which roll back and forth in these grooves. Surrounding the drive shaft 13 is a ball retainer 35 having a central opening 37 therein which receives the drive shaft 13 to enable the inwardly extending fingers 40 to be received within the grooves 37 to retain the balls 34 therein. The curvature of the concave surface 41 of each of these fingers is precisely formed to achieve the desired axial movement of the retainer 35 in response to radially outward movement of the balls 34, as will be seen.

The retainer 35 is held in place against movement to the right, as viewed in the drawings, by the ball bearing 43 whose inner race 44 surrounds the drive shaft 13 and is allowed to reciprocate axially thereon. The outer race 45 of this bearing contacts the fingers 46 of the actuator crank 48 (FIGS. 1 and 4) and thus resists rotation. Axial movement of the retainer 35 moves the bearing 43 therewith so that the non-rotating outer race 45 transfers the movement to the crank 48.

The actuator crank 48 is mounted for pivotal movement on the pin 50 secured at its opposite ends (see FIG. 4) to the bearing brackets 52 and 53 which are secured to the housing wall 16 by the screws 56 (FIG. 1). Suitable bearing members 57 are provided in the brackets 52 and 53 so that the crank 48 is free to pivot about the axis of the pin 50. The crank 48 is L-shaped and has one end integrally connected to the central portion of the pivot pin 50 so that rotation of this pin in response to movement of the fingers 46 causes movement of the crank 48. The other end of the crank 48 has a bearing pin 60 pivotally mounted thereon by the cross pin 61 so that the bearing pin can move within limits to apply only vertical force to the transfer roller.

An elongated roller support rod 65 is reciprocally mounted in the housing 10 by the support block 66 which has a central opening 67 therethrough for receiving the rod 65 with suitable bearings 68 therein for facilitating frictionless reciprocation of this rod. The lower end 71 of the rod 65 has an outwardly extending shoulder 72 thereon, and the coil spring 73 is imposed around the end 71 between the shoulder 72 and the threaded retainer 75 at the bottom of the bore 77 in the housing 10. The retainer 75 is threadedly received within the bore 77 so that the bias of the spring 73 can be varied by rotating the retainer. The lock screw 78 threadly engages a complementary threaded bore in the housing 10 to lock the retainer 75 in position in the usual manner.

The opposite end 79 of the rod 65 has a transfer roller 80 supported thereon (see FIG. 3), and this roller includes a ball bearing 82 whose inner race 83 is mounted on the reduced diameter portion 84 on the rod 65 so that it can be locked in place between the shoulder 85 and the inner portion 86 of the cap 87 which is threadedly received on the end 79. The top surface of the non-rotating cap 87 is smooth and the pin 60 on the crank 48 adjusts (FIGS. 1 and 2) to transfer the movement of the crank 48 to the rod 65. The outer race 88 of the bearing 82 is received in a complementary bore 91 in the roller 80, and the snap ring 92 is used to secure the roller thereon. A resilient rubber tire 95 is received in the groove 96 formed in the roller 80 for transferring rotary movement of the input disk 12 to the output disk 98. 80–90 durometer polyurethane rubber has been found to be a highly satisfactory material for the tire 95 although other resilient materials can be used without departing from the scope of the invention.

The output disk 98 is mounted on an output shaft 100 which is parallel to the input shaft 13 and is journaled in the bearing member 102 secured to the quill 103 held on the main housing 10 by the bolts 104. The balls 106 of the bearing member 102 engage the complementary grooves 107 of the shaft 100 and thus permit rotary movement thereof while resisting axial movement thereof. The left-hand end of the output shaft 100 is adapted to have the load secured thereto, e.g., a fan or blower which must be driven at a constant speed.

As shown in FIGS. 1, 5 and 6, the output shaft 100 has a reduced diameter end portion 110 which is slidably received in the bore 111 in the boss 113 formed on the rear side 114 of the output disk 98. The end portion of the output shaft 100 has a pin 115 extending therethrough with the flat cam surfaces 116 on the portions thereof extending diametrically outwardly on opposite sides of the shaft 100. These cam surfaces engage complementary cam surfaces 118 on the boss 113 of the output disk 98. The angles $a$ and $b$ (FIG. 5) formed by the surfaces 116 and 118, respectively, are equal and can be varied to achieve the desired relative axial displacement therebetween. The width $c$ of the surfaces 116 is substantially less than the corresponding width $d$ of the surfaces 118 thereby permitting relative movement therebetween.

The input and output shafts 13 and 100 are held against axial movement to squeeze the transfer roller 80 between the disks 12 and 98 so that the resilient tire 95 frictionally engages the surfaces 30 and 120. When a high torque is applied to the input shaft, or the load on the output shaft 100 increases, there is a slight amount of relative movement between the output disk 98 and the output shaft 100 causing the disk 98 to be cammed toward the right to increase the contact force between the transfer roller 80 and the disks 12 and 98 thereby reducing or eliminating slippage between the disks and the tire 95.

The various components of the drive mechanism are constructed so that the speed ratio R between the input and output shafts is equal to $$R = (c/y + k) - 1$$

where $y$ is the displacement of the roller 80, $c$ is the perpendicular distance between the center lines of the input and output shafts 13 and 100, and $k$ is the distance between the uppermost position of the roller 80 and the center line of the input shaft 13.

Also, the displacement S of the retainer 35, and the downward displacement $y$ are related as follows:

$$S = (\text{constant}) x(y)$$

or $$y = S/(\text{constant})$$

Thus the displacement of the retainer 35 results in a decrease in the speed ratio R or, as the driving shaft speed increases, the over-all speed ratio diminishes. The crank 48, the retainer 35, and the balls 34 are preferably sized and shaped to yield the exact relationship required to give a constant output speed for varying input speed.

Another embodiment of the invention is shown schematically in FIG. 12 wherein the input shaft 130 has an input disk 131 secured to one end thereof. Both sides 132 and 133 of the input disk 131 are smooth so that the rubber tires 134 and 135 contact these surfaces. The tires 134 and 135 are adapted to move radially with respect to the input disk 131, and this effects outward movement of the balls 138 which cause the cam retainer 140 to move axially on the input shaft 130. This movement effects pivotal movement of the crank 141 which acts through the cross member 142 to move the tire support shafts 143 and 144 up and down, as viewed in FIG. 12. The springs 146 are interposed between the support surfaces 147 and the flanges 148 on the shafts 143 and 144 so that the tires 134 and 135 are urged downwardly thereby.

The output shaft 150 is mounted for rotation above and parallel to the input shaft 130 by the bearings 151, and a pair of output disks 153 and 154 are mounted thereon so that the inner surfaces 155 and 156 thereof engage the tires 134 and 135, respectively. The left-hand disk 153 is rigidly secured to the shaft 150, whereas the right-hand disk 154 is mounted for limited angular movement thereof. Thus, the pin 157 extends through the shaft 150 and rides in the appropriately shaped cam groove 158 in the hub 160 on this disk 154. Accordingly, when a large amount of torque or load is applied to the system the output disk 154 tends to move relative to the output shaft 150 causing the disk 153 to be moved to the right to apply additional compression forces to sandwich the tires 134 and 135 and the disks 133.

In operation, as the speed of the input shaft 130 is increased, the balls 138 move outwardly to shift the retainer 140 to the right thereby moving the shafts 143 and 144 upwardly so that there is a constant speed from the output shaft 150. Similarly, when the speed of the input shaft 130 decreases the tires 134 and 135 are moved downwardly to maintain a constant output speed. This particular embodiment is especially suitable for high loads since the tires are sandwiched between the input and output disks 133, 154 and 155 thereby enabling maximum slip-free operation. It is also possible to use this embodiment to produce a variable speed output by making appropriate modifications as explained above in connection with FIGS. 1–11.

In operation, as the input shaft 13 is rotated through a wide range of speeds, the output shaft 100 is driven at a constant speed in the manner described below. As the input shaft 13 rotates the input disk 12 is also rotated causing the balls 34 in the grooves 32 to be urged outwardly in response to the centrifugal forces acting thereon in a radial direction. This action imparts an axial force to the right to the retainer 35 by reason of the contact between the balls 34 and the concave surfaces 41. The retainer 35 thus slides on the input shaft 13 causing similar movement of the bearing 43 whose outer race 45 engages the fingers 42 of the actuator crank 48. As a result, the actuator crank 48 pivots about the pin 50 to apply a downward force to cap 87 and the rod 65 against the bias of the spring 73. This spring applies a restraining force to the crank and tends at all times to position the roller 80 in its uppermost position whereas the action of the centrifugal force caused by rotation of the input shaft tends to move it downwardly. Thus, at any input speed, the centrifugal force and the bias of the spring seek an equilibrium position to maintain a constant output speed.

In its uppermost position, as shown in FIG. 1, the roller 80 is rotated at high speed since it is in contact with the outer portion of the input disk 12. However, this high speed is applied to the output disk 114 near the center thereof so that this disk is moved at the preset constant speed. As the roller 80 is moved downwardly, as shown in FIG. 2, in response to an increase of the speed of the input disk 13, the roller 80 is rotated at a slower speed but the output disk 98 speed does not change since the roller 80 engages the disk 98 at a point spaced further from the center thereof so that a constant output speed is always produced. Thus an increase in input speed causes the roller 80 to be lowered, as viewed in FIG. 1, whereas a decrease in input speed causes raising of this roller 80 by the spring 73, to always achieve the preset output speed.

While the invention has been described as being directed to a constant output speed, by adjusting the spring or making other design changes, it is possible to achieve variable output speeds in response to certain input speeds by adjusting the bias of the spring 73. For example, by reducing the bias of the spring 73 an increase in the input speed will effect a decrease in the output speed. It is also possible to use other types of biasing means other than coil spring 73 to achieve the functional results set forth above.

In order to maintain slip free contact between the tire 95 on the roller 80 and the surfaces 30 and 120 of the disks 12 and 98, the disks are held together so that a squeezing force is exerted on the tire. In order to achieve sufficient traction without slippage, the normal or squeezing force must be equal to or greater than the traction force divided by the coefficient of traction. Accordingly, when unusually high torques are exerted on either of the disks due to increases in speed or load, the output disk 98 moves through a slight angle with respect to the output shaft 100. This causes the output disk 98 to be cammed toward the right, as viewed in FIG. 1, since the cam surfaces 116 on the pin 115 engage the cam surfaces 118 on the boss 113. Thus, the normal or squeezing force on the roller 80 is automatically and continually adjusted to prevent slippage between the tire and the surfaces 30 and 120 to eliminate wear on the tire as well as irregular output speed.

The relationship between the cam angles $a$ and $b$ is as follows:

$$\tan a = \tan b \leq ur/r'$$

where $u$ equal the coefficient of traction, $r$ equal the traction radius or the radius of the roller 80, and $r'$ is the mean radius of the pin 115. Accordingly, the necessary dimension can be easily computed to insure that minimum squeezing forces are maintained on the roller 80 and the tire 95 to prohibit slippage.

The invention has thus provided an improved variable speed drive which is inexpensive and lightweight compared to flyball types of constant speed devices. The device automatically adjusts a roller so that a constant output speed is attained, and the normal force on the roller is constantly varied so that the traction force is always sufficient to prohibit slippage without binding. By reason of its structural design the device is compact and has a minimum number of constantly moving parts thereby substantially reducing failure due to wear or breakdown.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A variable speed drive assembly of the character described comprising, a housing, an input shaft journaled for rotation in said housing, an input disk on said shaft having a smooth surface thereon perpendicular to the axis of rotation of said input shaft, an output shaft journaled in said housing parallel to said input shaft and spaced radially therefrom a predetermined distance, an output disk on said output shaft having a smooth surface thereon perpendicular to the axis of said output shaft, said surfaces of said disks being spaced axially apart and overlapping in a radial direction, a roller mounted with its circumference in simultaneous frictional contact with said surfaces for transferring rotation of said input disk to said output disk, said input disk having a plurality of radial grooves formed in the side thereof opposite said smooth surface, a retainer mounted coaxially with said input disk having radial fingers which are received in said grooves, said fingers having a smooth curved inner surface, a ball in each of said grooves adapted to rotate with said input shaft and move outwardly in response to centrifugal force to impart a force to said fingers and move said retainer away from said input disk, actuator linkage interconnecting said retainer and said roller for moving said roller in a first direction in response to an increase in the speed of rotation of said input shaft, and means biasing said roller in a direction opposite said first direction to move said roller in said opposite direction in response to a decrease in speed of said input shaft.

2. A variable speed drive assembly of the character described comprising, a housing, an input shaft journaled for rotation in said housing, an input disk on said shaft having a smooth surface thereon perpendicular to the axis of rotation of said input shaft, an output shaft journaled in said housing parallel to said input shaft and spaced radially therefrom a predetermined distance, an output disk on said output shaft having a smooth surface thereon perpendicular to the axis of said output shaft, said surfaces of said disks being spaced axially apart and overlapping in a radial direction, a roller mounted with its circumference in simultaneous frictional contact with said surfaces for transferring rotation of said input disk to said output disk, said disks exerting a squeezing force on said roller, said input disk having a plurality of radial grooves formed in the side thereof opposite said smooth surface, a retainer mounted coaxially with said input disk having radial fingers which are received in said grooves, said fingers having a smooth curved inner surface, a ball in each of said grooves adapted to rotate with said input shaft and move outwardly in response to centrifugal force to impart a force to said fingers and move said retainer away from said input disk, actuator means associated with said retainer and said roller for moving said roller in a first direction in response to an increase in the speed of rotation of said input shaft and in a direction opposite said first direction in response to a decrease in speed of said input shaft, and means associated with at least one of said disks for moving said disks closer together in response to an increase in torque transmitted through said shafts to increase the squeezing force of said disks on said roller to reduce the possibility of slippage between said disks and said roller.

3. A variable speed drive assembly of the character described comprising, a housing, an input shaft journaled for rotation in said housing, an input disk on said shaft having a smooth surface thereon perpendicular to the axis of rotation of said input shaft, an output shaft journaled in said housing parallel to said input shaft and spaced radially therefrom a predetermined distance, an output disk on said output shaft having a smooth surface thereon perpendicular to the axis of said output shaft, said surfaces of said disks being spaced axially apart and overlapping in a radial direction, an idler roller mounted with its circumference in simultaneous frictional contact with said surfaces for transferring rotation of said input disk to said output disk, an actuator rod supporting said idler roller for movement with respect to said surfaces to alter the relative speeds of said input and output speeds as said idler roller is moved, said input disk having a plurality of radial grooves formed in the side thereof opposite said smooth surface, a retainer mounted coaxially with said input disk having radial fingers which are received in said grooves, said fingers having a smooth curved inner surface, a ball in each of said grooves adapted to rotate with said input shaft and move outwardly in response to centrifugal force to impart a force to said fingers and move said retainer away from said input disk, actuator linkage interconnecting said retainer and said roller for moving said roller in a first direction in response to an increase in the speed of rotation of said input shaft, and means biasing said rod in a direction opposite said first direction to move said roller in said opposite direction in response to a decrease in speed of said input shaft.

4. A variable speed drive assembly of the character described comprising, a housing, an input shaft journaled for rotation in said housing, an input disk on said input shaft having smooth faces on opposite sides thereof perpendicular to the axis of rotation of said input shaft, an output shaft journaled in said housing parallel to said input shaft and spaced radially therefrom a predetermined distance, a pair of output disks on said output shaft and having smooth surfaces thereon perpendicular to the axis of said output shaft, said output disks being spaced axially on opposite sides of said input disk and overlapping in a radial direction, a pair of rollers mounted on opposite sides of said input disk in sandwiched contacting relation with said input and output disks for transferring rotation of said input disk to said output disks, said input disks exerting a squeezing force on said rollers, automatic means for positioning said rollers with respect to said disks to produce a constant output speed of said output shaft even though the speed of said input shaft varies, and means associated with at least one of said output disks for moving said output disks closer together in response to an increase in torque transmitted through said shafts to increase the squeezing force of said disks on said rollers to reduce the possibility of slippage beetween said disks and said rollers.

5. A variable speed drive assembly of the character described comprising, a housing, an input shaft journaled for rotation in said housing, an input disk on said shaft having a smooth surface thereon perpendicular to the axis of rotation of said input shaft, an output shaft journaled in said housing parallel to said input shaft and spaced radially therefrom a predetermined distance, an output disk on said output shaft having a smooth surface thereon perpendicular to the axis of said output shaft, said surfaces of said disks being spaced axially apart and overlapping in a radial direction, a roller mounted with its circumference in simultaneous frictional contact with said surfaces for transferring rotation of said input disk to said output disk, said disks exerting a squeezing force on said roller, a centrifugal force responsive device mounted on said input shaft and responsive to the rate of rotation of said input shaft, actuator linkage mechanically interconnecting said centrifugal force responsive device and said roller for moving said roller in a first direction in response to an increase in the speed of rotation of said input shaft, and means biasing said roller in a direction opposite said first direction to move said roller in said opposite direction in response to a decrease in speed of said input shaft.

6. A variable speed drive assembly as defined in claim 5 wherein means are provided on at least one of said disks for moving said disks closer together in response to an increase in torque transmitted through said shafts to increase the squeezing force of said disks on said roller to reduce the possibility of slippage between said disks and said roller.

7. A variable speed drive assembly as defined in claim 6 wherein said roller is provided with a resilient tire around its circumference so that an increase in said squeezing force more readily increases frictional contact between said tire and said disks.

References Cited

UNITED STATES PATENTS

| 833,177 | 10/1906 | Reimers | 74—200 |
| 1,700,981 | 2/1929 | Hayes | 74—196 |
| 1,814,165 | 7/1931 | Jacobsen | 74—200 |
| 2,678,566 | 5/1954 | Oehrli | 74—230.17 |
| 3,033,048 | 5/1962 | Perruca | 74—200 |
| 3,168,773 | 2/1965 | Frye | 74—215 X |
| 3,183,729 | 5/1965 | Tyler | 74—190.5 |
| 3,222,944 | 12/1965 | Harned | 74—208 X |
| 3,228,617 | 1/1966 | Roberts | 74—200 X |

FOREIGN PATENTS 1,217,633 12/1959 France.

DONLEY J. STOCKING, *Primary Examiner.*

DAVID J. WILLIAMOWSKY, *Examiner.*

L. H. GERIN, *Assistant Examiner.*